United States Patent Office 3,350,544
Patented Oct. 31, 1967

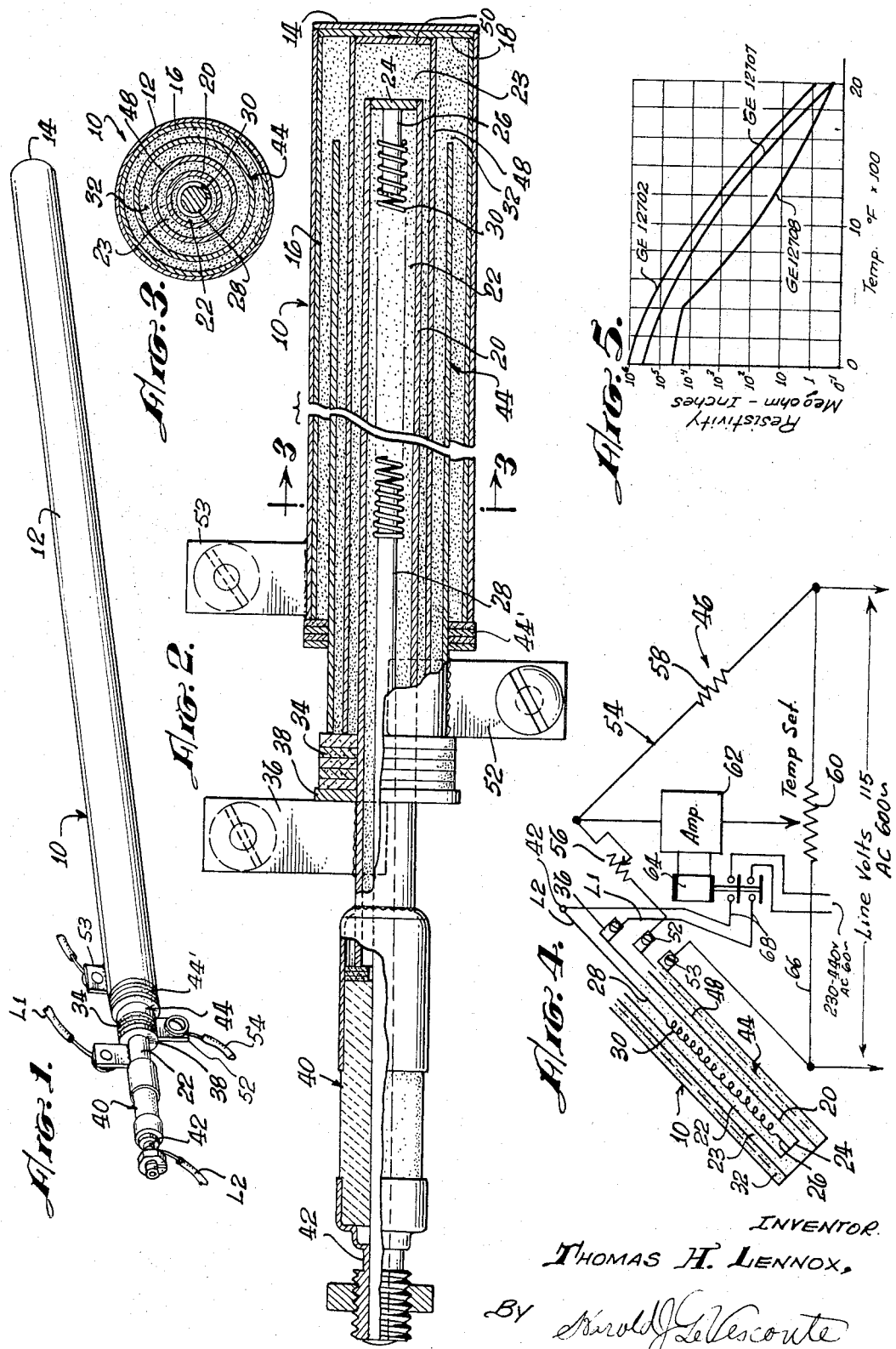

3,350,544
THERMO-ELECTRICALLY CONTROLLED ELECTRICAL HEATER
Thomas H. Lennox, Corona, Calif., assignor to Arc-O-Vec, Inc., Gardena, Calif., a corporation of California
Filed May 1, 1964, Ser. No. 364,079
8 Claims. (Cl. 219—548)

This invention relates generally to improvements in high temperature electrical resistance heaters of the type wherein an electrical heating element is embedded in a high temperature resistant, thermally conductive, electrical insulating material enclosed within an outer metallic casing or sheath. The invention relates more particularly to an electrical heater of this type which is uniquely constructed to provide the same with an integral detector for sensing the heater temperature. The invention relates also to a method of sensing the temperature of an electrical resistance heater of the character described.

Generally speaking, high temperature electrical resistance heaters of the type to which this invention pertains are equipped with an electrical resistance heating element, or coil, contained within an outer metallic tube from which the element is electrically insulated by an intervening high temperature resistant, thermally conductive, electrical insulating material. One of the most commonly used electrical insulating materials for this purpose is MgO. For reasons which become apparent as the description proceeds, MgO is preferred as the electrical insulating material in the present improved resistance heater. In fabricating a typical resistance heater of this type, the heating coil is placed within its containing tube and the latter is filled with powdered MgO about the coil. The tube is then subjected to a swaging operation which reduces the tube diameter sufficiently to compact the MgO into rock-like hardness.

Electrical resistance heaters are used to heat a wide variety of structures, such as ovens, dies, and so on. In most of these applications, it is desirable or necessary to control the electrical power to the heater in order to maintain the heated structure at a given temperature or within a given temperature range. Heretofore, it has been the common practice to effect control of thermal electrical resistance heaters by means of a temperature detection system embodying a temperature sensing element separate from and external to the resistance heaters. The sensing element is placed at some point within the heated structure and controls the electrical power to the resistance heater or heaters which heat the structure through the intermediate agency of a relay control system or the like.

Temperature control systems of this leave much to be desired. For example, the temperature sensing element which is employed in the existing temperature control systems is effected to sense the temperature at only one point within the heated structure. As a result, it is possible for overheating to occur in other parts of the heated structure or in the resistance heater itself with the resultant damage to the structure or to the heater. This possibiliy of overheating, of course, may be minimized by using a plurality of temperature sensing elements placed at various positions about the structure. This approach, however, still does not entirely eliminate the possibility of overheating, particularly overheating of the heater itself, and, in addition, is costly.

In spite of the foregoing and other deficiencies, all methods of effecting thermal control of electrical resistance heaters of the type under discussion, of which I am aware, involve the use of temperatre sensing elements external to and separate from the resistance heaters themselves. This invention provides an improved electrical resistance heater which is uniquely constructed to provide the same with an integral temperature sensing function which may be used in conjunction with an external electrical control system for regulating the electrical power to the heater in such manner as to maintain the heater itself, and thereby the heated structure, at the desired temperature or within the desired temperature range. An unique advantage of this temperature sensing function is that the latter occurs at an infinite number of positions throughout the resistance heater in such manner that the temperature control function of the heater is responsive to the highest temperature at any point within the heater. This temperature control function, herefore, permits much more accurate temperature control of the heated structure and avoids overheating of the resistance heater itself.

As will become apparent from the ensuing description, the temperature sensing structure and function of the invention may be embodied in electrical resistance heaters of various types. The invention will be described, however, in connection with one particular type of electrical resistance heater, namely that disclosed in my copending application, Ser. No. 354,070, filed Mar. 23, 1964, and entitled Resistance Heating Element.

It is a principal object of the present invention, therefore, to provide an electrical resistance heater having an integral temperature sensing means which may be used in conjunction with an external control system for regulating electrical power to the heater, thereby to control heater temperature.

Another object of the invention is to provide an improved electrical resistance heater of the character described wherein the integral temperature sensing means of the heater is effected to sense the highest temperature at any point within the heater.

A further object of the invention is to provide an unique method of sensing the temperature of an electrical resistance heater.

Yet a further object of the invention is to provide an electrical resistance heater, and a method of sensing the temperature of an electrical resistance heater, which are relatively simple, economical to construct and practice, and are otherwise ideally suited to their intended purposes.

With the foregoing objects in view, together with such additional objects and advantages as may subsequently appear, the invention resides in the parts and in the construction, combination and arrangement of parts described, by way of example, in the following specification of a presently preferred embodiment of the invention, reference being had to the accompanying drawings which form a part of said specification and in which drawings:

FIG. 1 is a perspective view of an electrical resistance heater constructed in accordance with the invention;

FIG. 2 is an enlarged longitudinal section through the heater in FIG. 1;

FIG. 3 is a transverse section through the heater taken along line 3—3 in FIG. 2; and FIG. 4 diagrammatically illustrates the resistance heater of FIGS. 1 through 3 electrically connected in an external control system for regulating the electrical power to the heater in response to heater temperature.

Referring to the drawings, particularly to FIGS. 1 through 3, there is illustrated an electrical resistance heater 10 which is identical, except for the temperature sensing features of the present invention embodied therein, to the electrical resistance heater disclosed in my aforementioned co-pending application, Ser. No. 354,070. For this reason, the structure of the heater 10 which is identical to my prior heater will be described only in sufficient detail to enable a clear and complete understanding of the present invention. With this in mind, the heater 10 comprises a two ply outer metallic sheath means comprising an outer tube 12 closed at one end by an end member 14, and closely embracing an inner sheath or tube 16 closed at one end by an end member 18 disposed in juxtaposition to the end member 14 as shown.

Extending concentrically within the sheath is a relatively small heater coil supporting tube 20 providing an annular space between the tubes. As will be explained shortly, this space is filled with high temperature resistant, thermally conductive, relatively non-electrically conductive materials to be presently described. As will be evident from the ensuing description, various types of high temperature resistant, thermally conductive materials may be used in the present heater. According to preferred practice of the invention, however, these materials comprise commercially available electrical grades of MgO having certain properties to be discused shortly. During manufacture of a typical resistance heater according to the envention, the bodies of MgO are introduced into the heater in powder form and are compressed into rock-like hardness by a swaging operations.

Welded or otherwise rigidly joined at one end to the end member 24 of the inner tube 20, and extending a short distance coaxially through the inner end of the latter tube, is a metal pin 26. Extending coaxially through and beyond the outer end of the inner tube 20 is a metal terminal rod 28. An electrical resistance heating coil 30 extends between and is conductively connected to pin 26 and terminal rod 28 in such manner as to complete an electrical circuit from the inner tube 20, through the end member 24, pin 26, and coil 30 to the terminal rod 28. The terminal rod 28 and the heating coil 30 are coaxially positioned within the tube 20, in spaced relation thereto, by an interposed mass of high temperature, resistant, thermally conductive, electrical insulating material 22. This insulating material may comprise MgO which is compacted into rock-like hardness by swaging operation.

Inner tube 20 projects beyond the open end of the sheath. The outer end of tube 20 carries a stack of mica washers 34. An electrical terminal member 36 is welded to the tube 20 just beyond the washers 34. A metal washer 38 is interposed between the terminal 36 and the adjacent mica washer 34.

The outer end of the terminal rod 28 projects a distance beyond the outer end of the inner tube 20. The outer end of the rod is mechanically connected to, electrically insulated from, and hermetically sealed to the outer end of the inner tube 20 by any suitable means such as a ceramic cap structure 40 of the type described in detail in my aforementioned co-pending application, Ser. No. 354,070. This ceramic cap structure has a threaded metallic terminal 42 at one end through which the outer end of the terminal rod 28 extends. The terminal rod is brazed to the terminal 42.

As thus far described, the electrical resistance heater 10 is identical to the electrical resistance heater disclosed in my aforementioned co-pending application, Ser. No. 354,070, except that in my prior heater, the corresponding mica washers 34 seat directly against the open ends of the outer metallic tubes 12 and 16 of the heater, whereas in the present heater, mica washers 35 close the ends of the tubes forming the heater sheath. In a typical heater of this type, the outer tube 12 and its respective end member 14 are fabricated from a chromium containing, high heat resistant nickel alloy. The inner tube 16, the coil supporting tube 20, tubular electrode 44 and inner tube 48 and the end members 18, 24 and 50 are all formed from a mild steel. The reason for this particular combination of metals is explained fully in my aforementioned co-pending application. Simply stated, however, the outer chromium nickel alloy tube 12 provides the heater with the required structural strength and resistance to oxidation at its normally high operating temperatures while the inner mild steel sleeves prevent diffusion of the chromium contents of the outer tube 12 into the adjacent MgO with resultant changes in the resistance values of the MgO. In operation, the voltage is impressed across the terminals 36 and 42, through leads L1 and L2 connected to the heater terminals 36 and 42, respectively, to energize the resistance heating coil 30. The resultant heat generated by the coil is conducted through the bodies of MgO and the associated metallic tubes to the outside of the heater.

According to the present invention, the electrical resistance heater 10 is equipped with an unique temperature sensing means which is connected in an external control circuit 46, as diagrammatically illustrated in FIG. 4, to regulate the supply of electrical energy to the heater coil 30 and, thereby control both its temperature and the temperature of the structure heated by the heater. The said temperature sensing means comprises a metallic tube 48 concentrically disposed about the center tube 20 of the heater, in concentric spaced relation thereto and a tubular metallic electrode 44 disposed in concentric spaced relation between the tubes 48 and 46. The inner end of the tube 48 is closed by the end member 50. The outer end of the tube 48 projects beyond the outer ends of the outer sleeves 12 and 16 of the heater into engagement with the stack of mica washers 34. The end member 50 of tube 48 is welded or otherwise electrically connected to the end member 18 of the inner tube 16 and is thus electrically connected to the outer sheath. The space between the tubes 20 and 48 is filled with a body 23 of compacted MgO which is of the same grade as the body 22.

The outer end of the electrode 44 extends beyond the outer end of the heater tubes 12 and 16 and into engagement with mica washers 34. The space between tube 48 and tube 16 is filled with a mass 32 of MgO of a different grade and electrode 44 is concentrically embedded in this body of MgO. A third terminal 52 is welded to the outer end of the electrode 44 and a fourth terminal 53 is carried by the outer sheath tube 12. A plurality of mica washers 44' carried by the electrode 44 is held against the end of the sheath structure by the engagement with terminal 52 to seal the exposed MgO 32.

The operation of the temperature sensing means of the invention is based on the fact that the specific electrical resistivity of MgO varies both with temperature and with the percentage of impurities present in the MgO, in the manner indicated by the family of curves set forth in FIG. 5. Various standard grades of MgO having different degrees of purity and resultant different, known temperature-resistivity properties are available on the open market and have standard catalog numbered designations by which they may be purchased. The curves on FIG. 5 indicate these properties for certain commonly employed and presently available grades of MgO, e.g., GE 12702, GE 12707 and GE 12708 all of which are manufactured and sold by General Electric. Incidentally, the lower catalog numbers indicate MgO of higher purity. This graph is derived from data appearing on catalog sheets issued by General Electric for each of these materials and demonstrates both that specific resistivity decreases as temperature increases and that the purer the material, the greater is the specific resistivity of the MgO for a given temperature.

According to the present invention, a relatively high grade (i.e., pure) MgO is employed at 22 and 23 in the present resistance heater to provide the required high electrical resistance necessary to prevent short circuiting of the resistance heating coil 30. The grade or purity, of the MgO which is placed at 32 in the present heater, on the other hand, is chosen to respond within the temperature range in which the heating element is designed to operate. In other words, the MgO which is placed at 32 in the heater is selected to have a purity such that the straight portion of its curve falls within the operating temperature range of the heater so that a given change in temperature produces maximum change in the specific resistivity of the MgO. In the case of the curves illustrated in FIG. 5, for example, if the heater is designed to operate in the temperature range of 1900°–2000° F., the MgO corresponding to curve GE 12707 would be selected for use at 32 in the heater.

In operation of the present resistance heater 10, the terminals 52 and 53 of temperature sensing means of the heater are connected in an electrical bridge circuit 46, in the manner illustrated in FIG. 4. Bridge circuit 46 includes a trimming resistor 56 in the leg of the circuit connected to terminal 52, a fixed resistor 58 in the leg 54 of the circuit, an adjustable temperature setting resistor 60 which provides resistance in the two remaining legs of the circuit, and an amplifier 62 in the bridge of the circuit for controlling a relay 64. The bridge is energized through lead 66 connected to a suitable power source. Relay 64 upon being energized, connects the power leads 68 to a suitable power supply for energizing the heating coil 30 of the unit.

In operation of the heater 10, terminals 52 and 53 of the heater are connected in the bridge circuit 54 in the manner illustrated in FIG. 4, so that the MgO 32 in the heater, between the center tube 48 and the electrode 44 and between electrode 44 and the inner sheath tube 16, which is electrically common with tube 48 at 50 and 18, provides an additional, temperature responsive variable resistance in the trimmer leg of the bridge and which, at the same time, is completely shielded from stray influencing voltages deriving from leakage through MgO 32 to the sheath means. Terminals 52 and 53 of the heater are connected by relay 64 in such manner that the resistance coil 30 of the heater is energized through the supply lead 68 when the relay 64 is closed by the amplifier 62. As the temperature of the heater 10 varies, the specific resistivity of the MgO 32 in the heater varies according to its particular curve, which may, for example, be one of those illustrated in FIG. 5. The current flow between the inner tube 48, outer tube 16, and the electrode 44, through the intervening MgO 32, varies of course, in direct relation to the specific resistivity. The hottest portion of MgO 32 would control the major current flow in the control circuit because it is electrically in parallel with the balance of the MgO 32 in any cooler areas of the heater and with corresponding higher resistance of those cooler areas and thus the heater control is sensitive to localized "hot spots" on the heater. Bridge 54 is adjusted, by setting the trimmer resistance 56 and the temperature setting resistance 60, in such manner that the relay 64 remains closed, to energize the heater coil 30 so long as the heater remains below a predetermined temperature at which a given current flow occurs between the tubes 48 and 16 and the electrode 44 of the heater through the intervening MgO 32. The relay opens, to cut off the supply of electrical power to the heater coil 30, in response to an increase in this current flow resulting from an increase in the temperature of the heater. Relay 64 is reclosed, to again energize the heater coil 30, in response to a reduction in the heater temperature below the predetermined temperature for which the bridge is set.

Thus there has been provided a high temperature electrical resistance heater which incorporates a temperature sensing means which may be connected to an external control circuit, such as the bridge circuit 54 in FIG. 4, to regulate the electrical power to the heater in such manner as to maintain the heater temperature within a predetermined temperature range. As noted earlier, the MgO which is placed at 32 in the heater is selected so that the straight portion of its curve of specific resistivity falls within the desired operating temperature range of a heater, thereby to provide the temperature sensing means of the heater with maximum sensitivity to temperature changes within the operating temperature range. Moreover, since the sensing means is incorporated in the heater, it responds more quickly to temperature changes than would be possible if the sensor were in the medium or material being heated.

It will be immediately evident to those skilled in the art that although the invention has been described in connection with the basic electrical resistance heater construction similar to that disclosed in my aforementioned copending application, Ser. No. 354,070, the temperature sensing features of the invention may be embodied in various other types of basic heater constructions. Accordingly, the invention should not be regarded as limited in application to my prior heater construction.

Moreover, while in the foregoing specification there has been disclosed a certain presently preferred embodiment of the invention, the invention is not to be deemed to be limited to the specific details of construction thus disclosed by way of example, and it will be understood that the invention includes as well all such changes and modifications in the parts and in the construction, combination, and arrangement of parts as shall come within the purview of the appended claims.

I claim:

1. An electrical heater having an elongated body and terminal means mounted adjacent one end thereof comprising:

a thermally conductive housing comprising concentric spaced inner and outer metallic tubes electrically, hermetically, and conductively interconnected by metallic closure means at one end thereof and hermetically interconnected by insulating closure means at the second end thereof, an electrical resistance heating means extending beyond said metallic tubes and substantially concentrically permanently mounted within the space defined by said tubes of said housing, by means establishing heat transfer relation with said tubes, a thermally conductive electrical insulating material within said inner tube about said heating device for electrically insulating the latter from said inner tube, a temperature responsive, electrical resistance material confined by said closure means disposed between said inner and outer tubes of said housing and establishing a heat transfer relation between said walls and having a specific electrical resistivity which decreases at a predetermined rate as the temperature of said resistance material increases, a pair of first terminals conductively connected to said heating means and extending through said insulating closure means, and affording connection of said first terminals to an electrical power supply for energizing said heating means, an electrode embedded in said temperature responsive material and substantially equally spaced from said tubes and extending through said insulating closure means, and a pair of second terminals conductively connected to one another through said resistance material and affording connection of said second terminals and said resistance material in a control circuit for controlling energizing of said heating element by said power supply one of said terminals being electrically connected to said housing and the other of said terminals being electrically connected to said electrode.

2. An electrical heater according to claim 1, wherein: said resistance material comprises highly compacted, electrical grade MgO of a grade having a known rate of decreasing resistivity concurrently with an increase of heat imposed thereon.

3. An electrical heater having an elongated body and terminal means mounted adjacent one end thereof comprising:

an outer metallic tube, an inner metallic tube disposed in spaced, coaxial relation within said outer tube and hermetically, electrically, and conductively connected to said outer tube by metallic closure means at one end thereof, and hermetically interconnected by insulating closure means at the second end thereof, an electrical resistance heating device extending through said inner tube and beyond said outer metallic tube and substantially concentrically permanently mounted within and hermetically and electrically insulated from said inner tube, a thermally conductive electrical insulating material within said inner tube about said heating device for electrically insulating the latter from said inner tube, a thermally conductive, temperature responsive, electrical resistance material confined by said closure means and filling the space between said inner and outer tubes and having a specific electrical resistivity which decreases at a known rate as the temperature of said resistance material is increased, a first pair of terminals conductively connected to said heating device and extending through said insulating closure means, and affording connection of said first terminal to an electrical power supply for energizing said device, and a second pair of terminals separately conductively connected to said resistance material for completion of an electric circuit between said second terminals through said resistance material and affording connection of said second terminals and said resistance materials in a control circuit including devices operable to effect energization and de-energization of said heating device by said power, one only of said second terminals being carried by said tubes.

4. An electrical heater having an elongated body and terminal means mounted adjacent one end thereof comprising:
an outer metallic tube,
an inner metallic tube disposed in spaced, coaxial relation within said outer tube and hermetically, electrically and conductively connected to said outer tube by metallic closure means at one end thereof, and hermetically interconnected by insulating closure means at the second end thereof,
an electrical heating device extending through said inner tube and beyond said outer metallic tube and substantially concentrically permanently mounted within and hermetically, electrically insulated from said inner tube,
a thermally conductive electrical insulating material within said inner tube about said heating device for electrically insulating the latter from said inner tube,
a thermally conductive, temperature responsive, electrical resistance material confined by said closure means filling the space between said inner and outer tubes and mounting said heating device in coaxially spaced relation; said resistance material having a specific electrical resistivity which decreases at a known rate as the temperature of said resistance material increases,
a pair of electrical conductors electrically conductively connected to said resistance material and including at least one conductor embedded in said resistance material,
a first pair of terminals conductively connected to said heating device and extending through said insulating closure means and affording connection of said heating device to an electrical power supply for energizing said device, and
a second pair of terminals connected one each to one each of said conductors and affording connection of said conductors and said resistance material in a control circuit including devices actuated thereby operable to effect de-energization of said heating device by said power supply at such times as the temperature of said resistance material is such as to effect the closing of the control circuit therethrough.

5. An electrical heater according to claim 4, wherein: said resistance material comprises highly compacted MgO of a grade having a known rate of decreasing resistivity concurrently with the increase of temperature imposed thereon.

6. An electrical heater having an elongated body and terminal means mounted adjacent one end thereof comprising:
a thermally conductive housing comprising concentric spaced inner and outer metallic tubes electrically, hermetically, and conductively interconnected by metallic closure means at one end thereof and hermetically interconnected by insulating closure means at the second end thereof,
an electrical resistance heating means extending beyond said metallic tubes and substantially concentrically permanently mounted within the space defined by said tubes of said housing, by means establishing heat transfer relation with said tubes,
a thermally conductive electrical insulating material within said inner tube about said heating device for electrically insulating the latter from said inner tube,
a thermally conductive, temperature responsive, electrical resistance material within the space between said outer and inner tubes, said resistance material having a known rate of decrease of electrical resistivity as heat is imposed thereon,
an electrode extending through said insulating closure means embedded in said resistance material and substantially equally spaced from said inner and outer tubes so as to be conductively connected to either of said tubes only through said resistance material,
a first pair of terminals conductively connected to said heating device through said insulating closure means and beyond said outer metallic tube, and affording connection of said heating device to an electrical power supply for energizing said heating device, and
a second pair of terminals connected to said electrode and said outer tube, respectively, and affording connection of said electrode, said outer tube and said resistance material in a control circuit including devices operable incident to closing of the control circuit, to effect de-energization of said heating device by said power supply so long as said control circuit is closed.

7. An electrical heater according to claim 6 including:
a metallic sleeve encircling said heating device in coaxially spaced relation between the latter and said electrode, and
said sleeve being electrically conductively connected to said outer tube.

8. An electrical heater according to claim 6, wherein: said resistance material comprises highly compacted MgO of a grade having a known rate of decreasing resistivity concurrently with increase of heat imposed thereon.

References Cited

UNITED STATES PATENTS

| 2,063,642 | 12/1936 | Vanden Berg | 338—238 X |
| 2,271,975 | 2/1942 | Hall | 338—30 |
| 2,316,872 | 4/1943 | Kerner | 338—30 |
| 2,717,957 | 9/1955 | Ohlheiser | 338—25 |
| 2,831,099 | 4/1958 | Crowley | 219—212 X |
| 3,143,640 | 8/1964 | Becker | 219—494 |

FOREIGN PATENTS 994,986 6/1965 Great Britain.

RICHARD M. WOOD, *Primary Examiner.*

V. Y. MAYEWSKY, *Assistant Examiner.*